US006465737B1

(12) United States Patent
Bonato et al.

(10) Patent No.: US 6,465,737 B1
(45) Date of Patent: Oct. 15, 2002

(54) OVER-MOLDED ELECTRIC CABLE AND METHOD FOR MAKING SAME

(75) Inventors: Michel Bonato, Tournefeuille; Alain Trybucki, Launaguet, both of (FR)

(73) Assignee: Siemens VDO Automotive S.A.S., Toulouse-Cedex (FR)

( * ) Notice: Subject to any disclaimer, the term of this patent is extended or adjusted under 35 U.S.C. 154(b) by 0 days.

(21) Appl. No.: 09/786,980

(22) PCT Filed: Sep. 6, 1999

(86) PCT No.: PCT/EP99/06557

§ 371 (c)(1),
(2), (4) Date: Mar. 9, 2001

(87) PCT Pub. No.: WO00/14751

PCT Pub. Date: Mar. 16, 2000

(30) Foreign Application Priority Data

Sep. 9, 1998 (FR) ........................................... 98 11258

(51) Int. Cl.[7] ............................................... H02G 15/02
(52) U.S. Cl. ................................ 174/74 A; 174/102 SP
(58) Field of Search ......................... 174/110 R, 120 R, 174/74 A, 74 R, 102 SP; 439/604, 607

(56) References Cited

U.S. PATENT DOCUMENTS

| | | | | |
|---|---|---|---|---|
| 3,497,608 A | | 2/1970 | Elliott et al. | 174/135 |
| 5,276,752 A | * | 1/1994 | Gugelmeyer et al. | 385/55 |
| 5,733,145 A | * | 3/1998 | Wood | 439/589 |
| 5,906,513 A | * | 5/1999 | Peterson et al. | 439/320 |
| 5,990,419 A | * | 11/1999 | Bogese, II | 174/113 AS |

FOREIGN PATENT DOCUMENTS

| | | |
|---|---|---|
| GB | 807811 | 1/1959 |

* cited by examiner

*Primary Examiner*—Chau N. Nguyen
(74) *Attorney, Agent, or Firm*—Laurence A. Greenberg; Werner H. Stemer; Ralph E. Locher

(57) ABSTRACT

An overmolded electrical cable has a cable formed of a plurality of insulated conducting wires inside an insulating sheath. An overmolding material encapsulates the insulating sheath over at least part of a length thereof. The insulating sheath has an external surface formed with at least one groove accommodating the overmolding material. The sheath is formed with at least one fin in the at least one groove and the at least one fin forms an integral part of the sheath. A method for producing such an overmolded electrical cable is also disclosed.

9 Claims, 1 Drawing Sheet

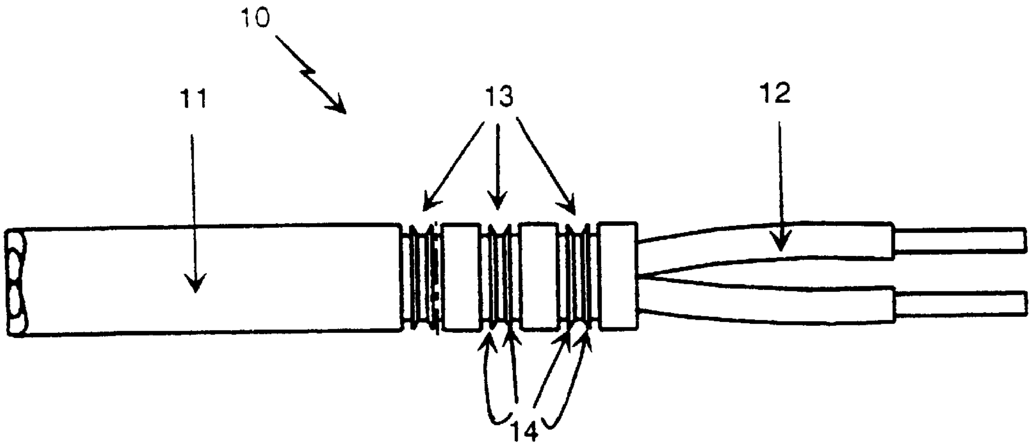
Figure 1
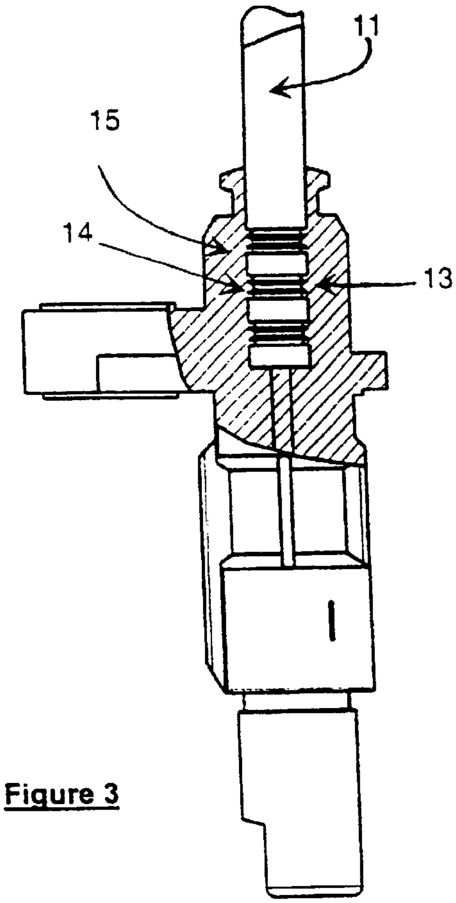
Figure 3
Figure 2
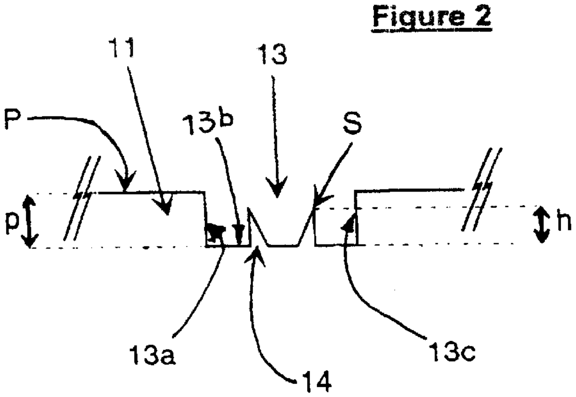

OVER-MOLDED ELECTRIC CABLE AND METHOD FOR MAKING SAME

BACKGROUND OF THE INVENTION

FIELD OF THE INVENTION

The present invention relates to a sealed overmolded electrical cable and to a process for producing such a cable. More particularly, it relates to an electrical cable intended to be placed in a motor vehicle.

A motor vehicle is designed to encounter all kinds of traffic, climatic and load conditions, etc. As a result, all the equipment mounted on a vehicle must be capable of demonstrating defect-free operation whatever the traveling conditions of the vehicle. For this purpose, it is especially required that electrical apparatuses on board the vehicle be well sealed, not only with respect to water but also to fuels, engine fluids, etc.

Of course, this sealing is also necessary around the power supply for these various components, and therefore at the point of introduction of the power cable into an electrical component.

It is also necessary to guarantee that an overmolded power cable is sealed. This sealing is to be provided between the cable and the overmolding material.

Such overmolded cables are widely used, for example for wheel speed sensors, overmolded connectors on a cable, etc., but also in other environments which are less severe.

It is known to ensure this sealing by a superficial scratching of the cable sheath by grinding or milling. The cable thus prepared is then overmolded. However, such operations do not ensure sufficient sealing in the case of certain applications, for example for wheel speed sensors.

SUMMARY OF THE INVENTION

The object of the present invention is to obtain optimum sealing between the cable and the overmolded material.

For this purpose, the present invention relates to an overmolded electrical cable comprising, on the one hand:

- a cable of the type composed of a plurality of insulated conducting wires inside an insulating sheath, and
- an overmolding material encapsulating the insulating sheath over at least part of its length, said overmolded cable being characterized in that:
- at least one groove is made in the external surface of the insulating sheath, said groove being suitable for accommodating the overmolding material.

Preferably, at least one fin forming an integral part of the sheath is made in the groove.

By virtue of such arrangements, the overmolded material cooperates not only with the groove made in the sheath, in order to ensure adhesive sealing, but also with the fin or fins in order to ensure cohesive sealing. For this purpose, the cooperation between the groove and the overmolded material enables these two materials to adhere perfectly to each other, even partially, over the entire range of their operating temperatures and whatever their respective expansion coefficients, whereas the cooperation between the fins and the overmolding material causes at least partial melting of the fins, thereby ensuring, after cooling, intimate cohesion between the two materials.

By virtue of this double (adhesive and cohesive) sealing, it is possible to guarantee optimum sealing of the overmolded cable according to the present invention.

Advantageously, in order to increase the degree of sealing, all that is required is to increase the number of grooves and/or the number of fins per groove.

It should also be noted that the profile of the fin has an influence on its ability to fuse with the overmolding material. Preferably, the thinner the fin the easier it is for it to melt. However, it is necessary to ensure that the amount of material coming from the fin remains in an amount sufficient to create homogeneous cohesion.

It should be noted that the grooves block the differential expansion that may occur between the material of the sheath and that of the overmolding. As regards the fins, these provide, by partial or indeed complete remelting, cohesion of the two materials.

It should also be noted that the sealing obtained according to the present invention is independent of the diameter of the cable and of the surface finish of the sheath. The sealing (by grooving) is also independent of the material pair chosen (cable and overmolding material) and of the design of the overmolding mold and of the processing parameters for the overmolding material.

Advantageously, the height of the fins made is less than the depth of the groove. Consequently, when the cable is handled before carrying out the overmolding operation, the fins are protected from any contact contamination (especially greases) which could cause deterioration of the cohesion between the fins and the overmolding material deposited subsequently.

The present invention also relates to a process for producing an overmolded cable. This process consists especially in:

- making at least one groove in the insulating sheath and
- overmolding the groove with an overmolding material in order to fill the groove and cause at least partial melting of the fin, so as to ensure sealing between the cable and the overmolding material.

Preferably, the process according to the invention also consists in creating at least one fin in the groove made.

Moreover, further objects, features and advantages of the present invention will become apparent from the description which follows, given by way of nonlimiting example and with reference to the appended drawings in which:

BRIEF DESCRIPTION OF THE DRAWINGS

FIG. 1 is a sectional schematic view showing a cable according to the invention before the overmolding operation;

FIG. 2 is a detailed schematic view of a groove according to the invention; and FIG. 3 is a schematic view of a sensor provided with an overmolded cable according to the present invention.

DESCRIPTION OF THE PREFERRED EMBODIMENT

According to the embodiment shown in FIGS. 1 to 3, an overmolded cable 10 according to the present invention comprises an insulating sheath 11 (FIG. 1) encapsulating a plurality of conducting electrical wires 12 (two wires in the example shown). Each of these conducting wires 12 is sheathed, in a manner known per se, in an insulating material.

It should be noted that the insulating sheath 11 has a relatively large thickness and a certain rigidity, even though it remains flexible. This sheath is generally made of a thermoplastic, elastomer or similar material.

According to the present invention, at least one (three in the example shown) basically U-shaped groove 13 is made in the thickness of this sheath. This groove does not completely perforate the sheath and is made in the external surface of the sheath 11.

Each of these grooves 13 has within it at least one fin 14 (two fins in the example shown). These fins are also made in the thickness of the sheath and do not pass right through it.

As will be more clearly seen in FIG. 2, the groove 13 is basically U-shaped. The fins 14 have, however, a cross section which decreases on going further away from the bottom of the groove. The utility of this decrease will be explained later.

As may be seen in FIG. 3, the cable shown in FIGS. 1 and 2 is overmolded with an overmolding material 15.

In general, this overmolding makes it possible to produce a complete electrical component, such as the sensor shown by way of example in FIG. 3. Since the construction of the rest of this sensor is known per se, it will not be explained here.

When overmolding with the material 15, which in general is a thermoplastic such as a polyamide filled with glass (or similar) fibers, the overmolding material comes into contact with, on the one hand, the walls 13*a,* 13*b,* 13*c* (FIG. 2) of the groove and, on the other hand, with the fins 14.

The entire groove 13 is filled with this overmolding material. On cooling, this material adheres strongly to the walls 13*a,* 13*b,* 13*c* of this groove. A first form of sealing, called adhesive sealing, is thus produced.

The contact of the overmolding material with the fins 14 also causes them to at least partially melt. Since these fins gradually thin toward the outside of the groove, the tip S of the fins melts as soon as the overmolded material touches them. In contrast, as the thickness of the fin increases so the melting of the latter becomes partial. This consequently causes the phenomenon of gradual anchoring of the non-melted part of the fin in the overmolding material. As regards that part of the fin that has melted, this causes intimate mixing of the materials involved. This melting and this anchoring create a second form of sealing, called cohesive sealing.

Creating this double (adhesive and cohesive) sealing ensures optimum sealing between the cable and the overmolding material. The adhesive sealing is obtained at the interface between the walls of the groove and the overmolding material and the cohesive sealing is obtained at the interface between the fins and the overmolding material.

It should be noted that the sealing is enhanced if the number of grooves and/or the number of fins per groove is increased.

The cable according to the invention thus has a plurality of grooves 13, each having a plurality of fins 14.

As is more clearly visible in FIG. 2, the tip S of the fins lies in a plane located below the plane P of the sheath 11. The height h of the fins is less than the depth p of the groove. Consequently, when the grooves and the fins are produced but the overmolding material has not yet been put into place, it is possible to handle the insulating sheath without contaminating the fin by contacting it. In particular, this prevents any handling of the not-yet overmolded sheath from depositing traces of fatty (or other) substances on the tip of the fins, which could subsequently impair the proper cohesion of the fins with the overmolding material 15.

It should be noted that any modification in the profile of the fins causes a modification in the degree of sealing. Thus, for specific applications, it is possible, by modifying this profile, to tailor the sealing to the necessary requirements.

It should also be noted that the simple fact of producing a grooving (without fins) already makes it possible to obtain good sealing. Simple grooving may therefore be sufficient to obtain the required sealing.

The present invention also relates to a process for producing an overmolded electrical cable, consisting in:

- making at least one groove in the insulating sheath and
- overmolding the groove with an overmolding material in order to fill the groove and cause at least partial melting of the fin, so as to ensure sealing between the cable and the overmolding material.

Preferably, this process also includes a step in which at least one fin 14 is made in the groove 13, prior to this groove being overmolded.

It will be noted that the machine (not shown) developed for making the grooves and fins has the advantage of not rotating the cable about its axis during the machining. Such a rotation of the cable would in fact be incompatible with long lengths of cable and/or with sensitive accessories (connectors, etc.).

Of course, the present invention is not limited to the embodiments described above and it encompasses any variant within the scope of a person skilled in the art. Thus, the shape of the groove may be different from that shown.

LIST OF THE REFERENCES USED

10 overmolded cable
11 insulating sheath
12 insulated conducting wires
13 groove
13*a,* 13*b,* 13*c* walls of the groove
14 fin
15 overmolding material

What is claimed is:

1. An overmolded electrical cable, comprising:

a cable formed of a plurality of insulated conducting wires inside an insulating sheath; and an overmolding material encapsulating said insulating sheath over at least part of a length thereof;

said insulating sheath having an external surface formed with at least one groove accommodating said overmolding material, said sheath being formed with at least one fin in said at least one groove, said at least one fin forming an integral part of said sheath.

2. The electrical cable according to claim 1, wherein said at least one groove has a defined depth and said at least one fin has a height less than said depth of said groove.

3. The electrical cable according to claim 1, wherein said overmolding material causes at least partial melting of said at least one fin and thus ensures, after cooling, adhesive sealing between said cable and said overmolding material.

4. The electrical cable according to claim 1, wherein said at least one fin is one of a plurality of fins and said at least one groove is one of a plurality of grooves, each groove having formed therein said plurality of fins.

5. The electrical cable according to claim 1, wherein said at least one fin has a given profile configured in accordance with a desired degree of sealing.

6. A method of producing an overmolded electrical cable having a cable formed of a plurality of insulated conducting wires inside an insulating sheath, which comprises the following steps:

forming at least one groove in the insulating sheath;

forming at least one fin in the at least one groove; and overmolding the at least one groove with an overmolding material for filling the groove and at least partially melting a material of the insulating sheath to assure sealing between the cable and the overmolding material.

7. The method according to claim 6, which comprises forming an adhesive seal at an interface between walls of the at least one groove and the overmolding material and forming a cohesive seal at an interface between the at least one fin and the overmolding material.

8. The method according to claim 6, which comprises forming the at least one fin with a height less than a depth of the at least one groove such that a tip of the at least one fin is protected against any contamination by contact prior to the overmolding step.

9. The method according to claim 6, which comprises forming the at least one groove as one of a plurality of grooves and forming the at least one fin as one of a plurality of fins in each groove, the fins having a height less than a depth of the grooves such that a tip of the fins is protected against any contamination by contact prior to the overmolding step.

* * * * *